United States Patent
Rand et al.

(10) Patent No.: US 9,922,062 B2
(45) Date of Patent: Mar. 20, 2018

(54) HIGH-PERFORMANCE GRIDDED DATA STORAGE, ARRANGEMENT AND EXTRACTION

(71) Applicant: ITERIS, INC., Santa Ana, CA (US)

(72) Inventors: Douglas K. Rand, Grand Forks, ND (US); John J. Mewes, Mayville, ND (US); Leif Pedersen, Grand Forks, ND (US); Kristopher A. Zarns, Fisher, MN (US); Dustin Salentiny, Grand Forks, ND (US)

(73) Assignee: CLEARAG, INC., Santa Ana, CA (US)

( * ) Notice: Subject to any disclaimer, the term of this patent is extended or adjusted under 35 U.S.C. 154(b) by 398 days.

(21) Appl. No.: 14/332,768

(22) Filed: Jul. 16, 2014

(65) Prior Publication Data

US 2016/0019214 A1    Jan. 21, 2016

(51) Int. Cl.
*G06F 17/30* (2006.01)

(52) U.S. Cl.
CPC .. *G06F 17/30321* (2013.01); *G06F 17/30241* (2013.01)

(58) Field of Classification Search
CPC ........ G06F 17/30241; G06F 17/30321; G06F 17/30336; G06F 17/3087
See application file for complete search history.

(56) References Cited

U.S. PATENT DOCUMENTS

| | | | | |
|---|---|---|---|---|
| 4,937,572 A * | 6/1990 | Yamada | ................. | G01C 21/32 340/990 |
| 5,968,109 A * | 10/1999 | Israni | ................... | G01C 21/32 701/532 |
| 6,460,026 B1 * | 10/2002 | Pasumansky | ..... | G06F 17/30592 707/737 |
| 6,470,287 B1 * | 10/2002 | Smartt | ............. | G06F 17/30241 345/419 |
| 6,484,179 B1 * | 11/2002 | Roccaforte | ....... | G06F 17/30592 707/737 |
| 7,689,621 B1 * | 3/2010 | Huber | .................... | G01C 21/32 707/743 |
| 9,396,249 B1 * | 7/2016 | Balasubramanian | | ........................ G06F 17/30595 |
| 2003/0036842 A1 * | 2/2003 | Hancock | ................ | G01C 21/20 701/532 |
| 2008/0016472 A1 * | 1/2008 | Rohlf | ................ | G06F 17/30241 715/848 |
| 2009/0182507 A1 * | 7/2009 | Havin | ..................... | G01W 1/10 702/3 |
| 2012/0066005 A1 * | 3/2012 | Stewart | .................. | G06Q 40/08 705/4 |
| 2015/0161150 A1 * | 6/2015 | Goering | ............ | G06F 17/30241 707/743 |

* cited by examiner

*Primary Examiner* — Shiow-Jy Fan
(74) *Attorney, Agent, or Firm* — Lazaris IP

(57) ABSTRACT

A high-performance gridded database protocol for storing, arranging, and extracting gridded data includes associating values for a single grid cell and storing them together to extract as many useful values as possible from a single read operation. Gridded data is stored in a geographically-indexed cylindrical grid that permits efficient data extraction for a particular location while maximizing efficiency of read operations. Cylinders of values are built by grouping grids that are related to each other so that when data for a location is to be extracted, a minimal number of read operations is needed to retrieve an entire stack of data relevant to the location.

12 Claims, 3 Drawing Sheets

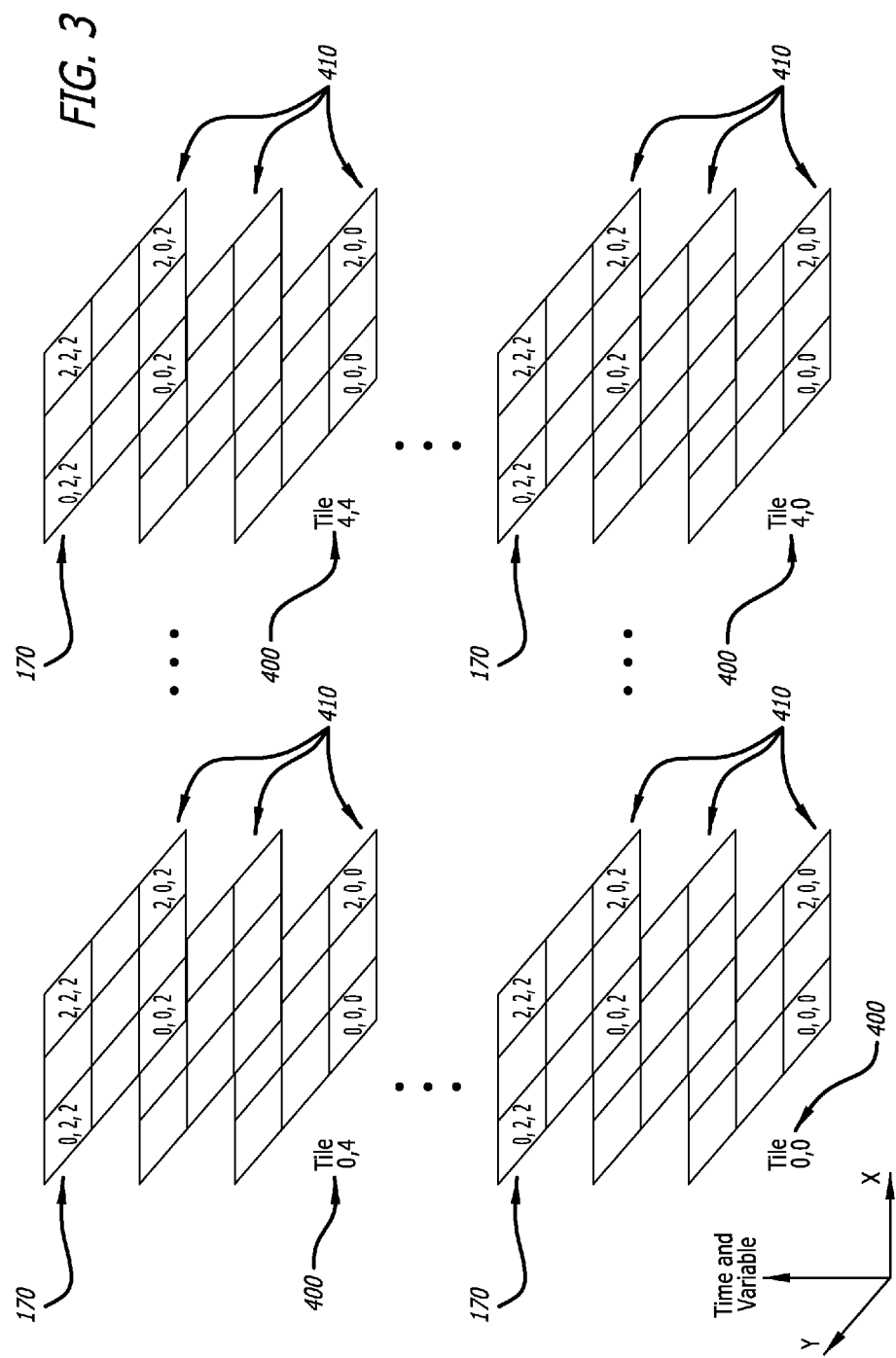

HIGH-PERFORMANCE GRIDDED DATA STORAGE, ARRANGEMENT AND EXTRACTION

CROSS-REFERENCE TO RELATED PATENT APPLICATIONS

This patent application claims priority to U.S. provisional application 61/846,633, filed on Jul. 16, 2013, the contents of which are incorporated in their entirety herein.

FIELD OF THE INVENTION

The present invention relates to storage of gridded data. Specifically, the present invention relates to storing, arranging and extracting gridded data that groups related data into data cylinders in order to maximize the efficiency of read operations when extracting values from grid cells relevant to a particular location or area.

BACKGROUND OF THE INVENTION

Many geospatial datasets are stored in the form of data grids that are geo-referenced to the surface of the Earth. For example, nearly all weather forecasts, along with historical and current condition weather analyses, are stored in a gridded data format, and weather information for performing forecasts and analyses is traditionally created, consumed, and stored as two-dimensional grids of values (or stacks of grids of values). Each grid cell that comprises a grid covers a region (e.g. a 5 km by 5 km square), and each grid cell has a single value.

Each grid covers some portion of the Earth, such as for example North America, Australia, the continental United States, the Great Lakes region (for example, for lake effect snow events), or even the entire globe. Different grids have different cell sizes, often based on the coverage of the grid. As an example, one grid may store the forecasted air temperature values across the continental US for 8 pm this evening. The 9 pm air temperature forecast is stored in a different grid, and the wind speed, wind direction, precipitation type, precipitation rate, and other parameters would also each be stored in a separate grid, again one for each time period. The number of grids across which data for a single location is spread can quickly grow into the thousands.

This manner of storage of gridded data in the existing art is efficient for e.g. weather models when generating and storing information. However, this is not efficient for facilitating quick access for a single or small number of locations for subsequent application of the data or other use. In other words, database storage paradigms in the existing art work well when providing input to the database, but they do not work well when one wants to extract data for subsequent use.

As an example of problems experienced with this existing approach to storing weather data, consider the effort involved to produce a detailed hour-by-hour forecast over a 48-hour period for a specific location. For each hour, data must be extracted for several different parameters, such as air temperature, dew point, wind speed, wind direction, wind gusts, visibility, type of visibility obstructions, cloud cover, and total probability of precipitation. Further for precipitation, one has to extract both probability and rate for the different precipitation types (i.e. rain, snow, slush, and ice). Data may be needed for 20 or more different parameters for each of the 48 hours, resulting in a thousand or more separate values.

Utilizing grids as in the existing art to build this forecast first requires that the location, represented by latitude and longitude, be transformed to the grid cell index that covers that location. As an example, for Grand Forks, N. Dak. the latitude is 47.924663 and the longitude is −97.033997. In a 10-km grid that covers the continental United States, this may map to the grid cell at row 233, column 261.

Building this forecast with a gridded data set requires that each of the thousand or so different grids (which are often stored as separate files) must be opened and that from each grid a single value at the 233,261 position must be extracted for the forecast. This is an expensive and time-consuming process. Grids are often stored in a compressed format which requires that a file first be opened, read, and uncompressed before being able to extract the single value needed. Even if the grids are stored uncompressed, for each grid a file must first be opened and then searched for the value needed, and then closed.

Scaling such an approach represents a serious challenge to efficiently serving up thousands of forecasts a second, as it simply requires too much wasted processing resources. Therefore, there is a need not found in the existing art for a quick, efficient, and cost-effective database protocol and method for storing, arranging, and extracting gridded data for different uses, such as in weather data provision.

BRIEF SUMMARY OF THE INVENTION

It is therefore one objective of the present invention to provide an approach to storage, organization, and extraction of gridded data. It is another objective of the present invention to provide an approach to storing gridded data that permits a cost-effective and speedy way of identifying and extracting information needed to support applications of data for confined locations. It is a further object of the present invention to provide an approach to organizing gridded data in a database that groups many values for a single grid cell or other sub-area and arranges them together so that a number of read operations is minimized when extracting values for confined locations. It is still another objective of the present invention to provide an approach that permits extracting a data store of grid cells so that a single read operation returns a whole stack of data relevant to the data request that is being fulfilled.

In one embodiment, the present invention provides a system and method of populating individual grid cells by collecting and writing data in a manner that stores values related to a grid cell together. This permits fast and efficient access to many values for a single geographic location, and provides a different approach to writing grids into a data store than is currently available in the existing art.

Another embodiment of the present invention provides a system and method of arranging the payload of stored data into cylindrical blocks that have both a height representing the number of different values in a cylinder of values (i.e., the number of grids) and a spread that covers several grid cells in a footprint of width and length covering more than a single grid cell. Such cylindrical blocks may take a variety of shapes—for example, they may be tall, comprising 256 values over a 4×4 grid cell tile, or short and wide, comprising 32 values over a 16×16 grid. Regardless, the groupings are arranged for maximum efficiency of read operations.

In another embodiment of the present invention, a system and method of extracting gridded data in an efficient and speedy manner involves retrieving a whole stack of data cells written and organized so as to group related grid cells together so that only a single read operation is needed to extract data relevant to a location.

Other objectives, embodiments, features and advantages of the present invention will become apparent from the following description of the embodiments, taken together with the accompanying figures, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 3 is a conceptual diagram showing an example of tiles of gridded data are formulated.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention is a high-performance gridded database protocol 100, embodied in systems and methods of storing, arranging and extracting gridded data 120. The high-performance gridded database protocol 100 provides an approach that is opposite to a format in which processes that generated gridded datasets normally generate information (i.e., to create information for a given parameter/time for all locations). Instead, the approach of the high-performance gridded database protocol 100 is to store data 120 in a format that is exceptionally efficient for the process of extracting data 120 for a relevant, confined location or set of locations, by minimizing the number of reads of stored data 120 required to access a full suite of information. In other words, the present invention looks at storing data 120 from an output perspective instead of an input perspective, and arranges gridded data 120 in such a manner that extracting it for easy use over a confined location occurs in an efficient and speedy manner.

Figure 1:
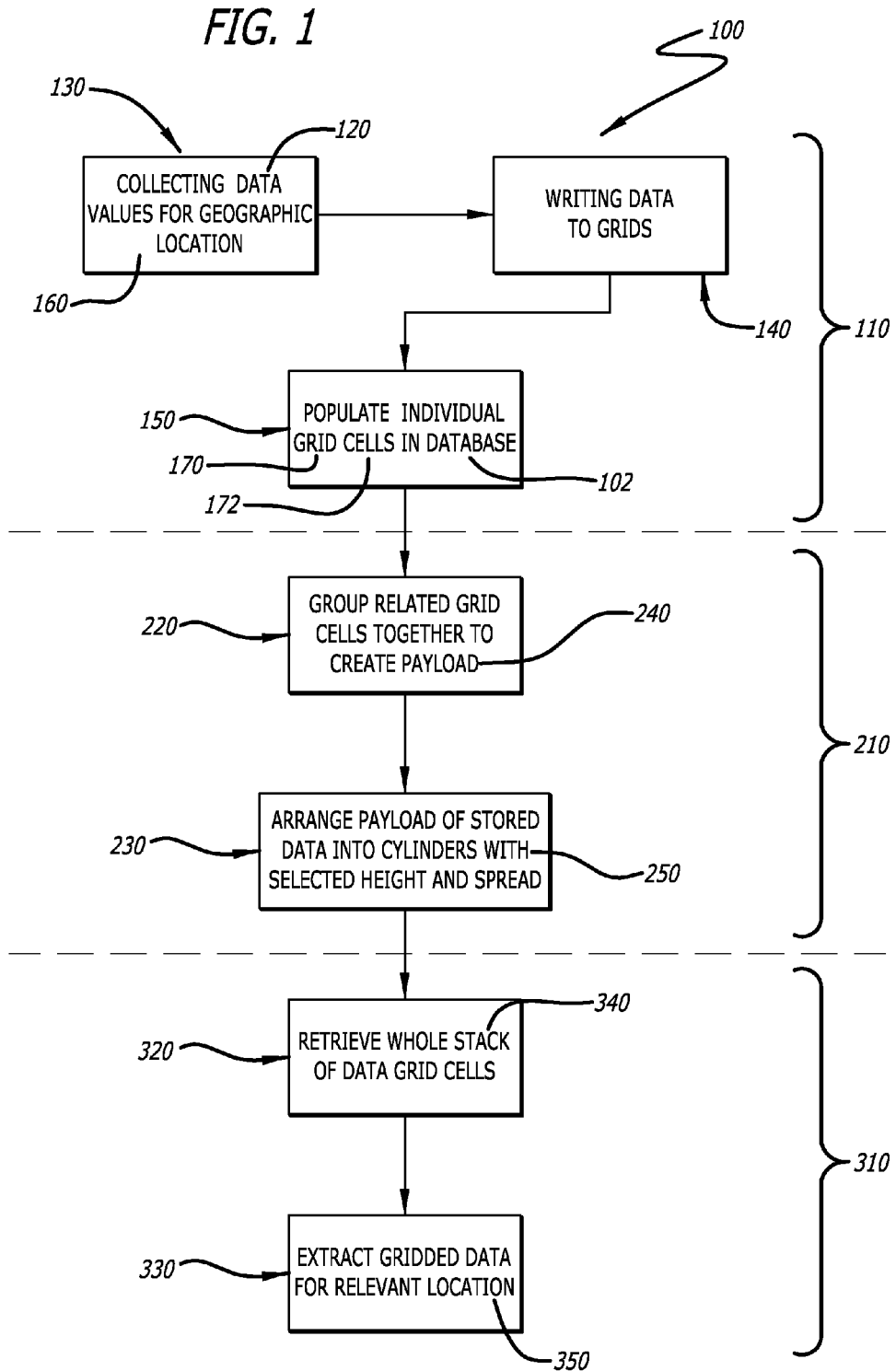
FIG. 1 is a flowchart of steps in a high-performance gridded database protocol and system and method of storing, arranging and extracting gridded data according to the present invention.

FIG. 1 is a flowchart of steps in which a write operation 110, a store operation 210, and a read operation 310 are part of a database protocol 100 for storing, arranging and extracting gridded data 120 according to the approach of the present invention. This approach provides a high-performance gridded database protocol 100 in systems and methods that enable a very quick and very efficient extraction of data values 120 for a relevant, confined geographical location 350. Currently, gridded data 120 exists as fairly large files representing the value of a single parameter across a large geographic region broken up into a grid 170 of cells 172. As an example, in the weather forecasting field, one file may represent the air temperature forecast from a particular forecast model for a specific time that is stored in a grid 170 that breaks up the continental United States into grid cells 172 of roughly 10 square kilometers. To extract a forecast for a point using currently-available methodology, one must open several hundred to a few thousand of these grid files and from each such grid file extract a single value (or very confined set of values).

The approach of the high-performance gridded database protocol 100 addresses this need by enabling many values that are for a single grid cell 172 to be stored together, so that one read operation 310 returns many useful data values 120. To understand this better, consider as a metaphor a pad of graph paper. Each sheet represents a grid 170 of cells 172, with each cell 172 covering some 10 km by 10 km region. One would need to flip to the right sheet in the pad and then read that single value, and then find a different sheet in the pad to read the next value, and do that perhaps a thousand additional times, until one arrives at the values needed to build a forecast.

Figure 2:
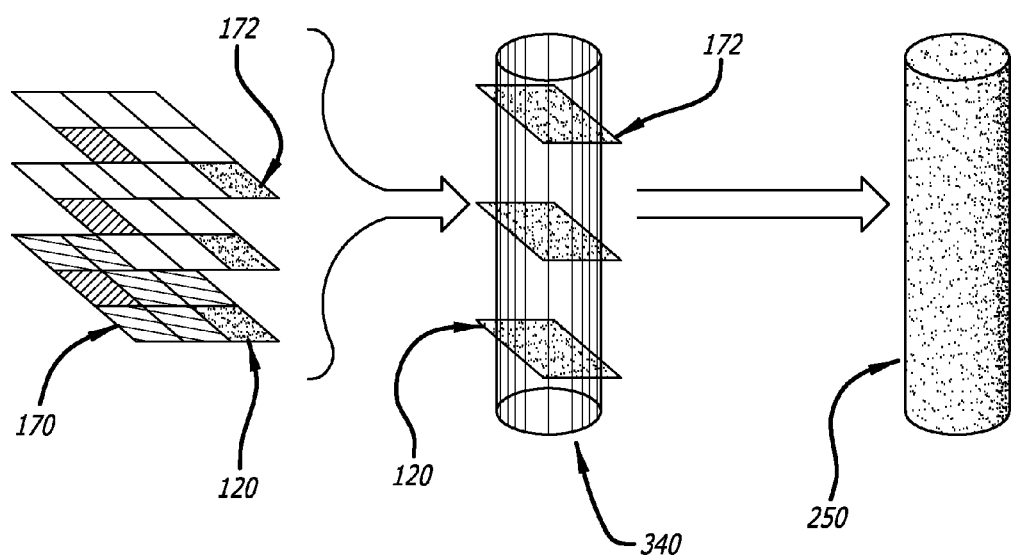
FIG. 2 is a conceptual diagram showing an example of how a cylinder of data is pulled from a stack of grids.

With the high-performance gridded database protocol 100 of the present invention, conceptually consider taking that same pad of graph paper and, using a hole punch, punch out each cell 172. For each cell 172, collect the holes from the punch and group them together in a stack 340. Now, they make up a cylinder of values, with different grids 170 stored at different levels in the cylinder 250. The cylinder 250 is stored by indexing under the geographic location 160 of the cell 172. FIG. 2 illustrates this concept, in an exemplary diagram of how a cylinder 250 of data 120 is pulled from a stack 340 of grids 170.

Later, when the weather data 120 is needed to build a forecast for a relevant location 350, simply retrieve that entire stack 340 of cells 172. With a single read operation 310, a whole stack 340 of data 120 that is relevant to the forecast is obtained. Further, as grids 170 are processed, the approach of the high-performance gridded database protocol 100 may also intelligently build the cylinders 250 of values by grouping grids 170 that are related into the same cylinder 250. This initial selection of grids 170 maximizes the efficiency of read operations 310 on the data store of cylinders 250. The initial selection of grids 170 is performed when the grids 170 are populated, so that they are arranged in such a stacked, cylindrical manner for later extraction. The present invention therefore includes, in one embodiment, a method for writing data 120 generated by weather models to a stack 340 so that a database 102 is populated with weather data 120 for which related grid cell 172 values are indexed relative to a geographic location 160 of a grid cell 172.

Referring to FIG. 1, the high-performance gridded database protocol 100 includes a write operation 110 in which gridded data values 120 are collected in a step 130 for a geographic location 160. In a step 140, these gridded data values 120 are written to a database 102, and individual grid cells 172 are populated in step 150.

In a store operation 210, the high-performance gridded database protocol 100 arranges gridded data 120 for subsequent extraction in a read operation 310. The store operation 210 includes grouping related grid cells 172 together to create a payload 240 in step 220, and arranging the payload 240 of stored data 120 into cylindrical blocks, or cylinders 250, in step 230. In step 230, the payload 240 may be arranged by selection the height and the spread of cylinders 250 as further discussed herein. In the read operation 310, the high-performance gridded database protocol 100 retrieves a whole stack 340 of gridded data cells 172 in step 320, and extracts gridded data 120 from the database 102 for a relevant geographic location 350.

The present invention may also include tiling data 120 into groups, to build further on the concept of cylindrical grid storage. This embodiment is shown in FIG. 3, which is a conceptual diagram of an example of arrangements of tiles 400 of gridded data 120. In such an embodiment, the high-performance gridded database protocol 100 may therefore include grouping adjacent cylinders 250 together and storing them as such groups 410. Referring back to the graph paper metaphor, a small tile 400 of data values 120 is built by grouping all of the data values 120 into rectangles of grid cells 170. Consider the 3×3 square, such as a tic-tac-toe square, as a possible tile size. The nine grid cells 172 that fall in the 3×3 square would together be considered a tile 400.

In an alternative approach to this embodiment, the present invention contemplates arranging grids 170 into small tiles 400 of a single value for a grid 170, for example a 32×32 grid cell tile 400. This results in the ability to quickly re-create an original grid 170, or to quickly extract data for a sub-area within the grid 170, but would still require reading a large number of tiles 400 to extract values for the weather forecasting example above.

Combining these two alternative approaches, instead of storing cylinders 250 of single grid cells 172, cylinders 250 of tiles 400 can be stored. Letting a block represent a group 410 of cylinders 250 that cover a single tile 400, by grouping cylinders 250 together into blocks, noticeable performance benefits are realized. In the example above, first, requests for weather forecasts are often grouped around population centers. If a block of cylinders 250 is stored together, a request for one cylinder 250 will also retrieve the adjacent cylinders 250. This causes the adjacent cylinders 250 to be in the operating system, database, and/or middleware caches, and thereby improves performance for requests that are nearby.

Second, by reducing the total number of objects to be stored in the database 102, the high-performance gridded database protocol 100 improves the performance of the database 102 as a whole. A grid 170 covering the continental United States with a cell size of 1 km by 1 km results in about 25,000,000 cylinders, which is a very large number of objects to store. By utilizing tiles 400 and cylindrical blocks 250 as described above, the number of objects to be stored can be dramatically reduced.

The cylindrical approach presents another challenge to organizing some data stores, in that for very large grids 170 (on the order of 26,000,000 values in a 7200×3600 grid), gathering hundreds of the grids 170 into physical RAM of a system may not be feasible, as around 300 GB need RAM would be needed in a system able to hold 1,000 of these grids 170 as cylinders 250 of data 120 are generated. To address this challenge, the grouping of cylinders 250 in blocks may also be arranged in specific ways that further facilitate reductions of the number of requests needed, as well as the amount of memory needed. Therefore, in another embodiment of the present invention, the payload 240 of stored data 120 is arranged into blocks that have both a height, representing the number of different values in a cylinder of values, and a spread covering several grid cells 172 in a footprint having a width and length covering more than a single grid cell 172. For example, the cylinders 250 may be tall, comprising 256 values over a 4×4 grid cell tile. This permits an improvement in efficiency for read operations 310, since queries of data 120 are often either for several hundred values for a single point, or a few hundred values along a line, and it is desirable to have each request provide as many useful values as possible. In another alternative, the cylinders 250 may be short and wide, comprising 32 values over a 16×16 grid cell tile. Regardless, this embodiment of the present invention results in significant enhancements in processing time by minimizing the number of needed read operations 310.

The selection of the height and spread implies a balance between how much physical memory that ingest systems must have to queue many large grids 170 at the same time, the cache advantages of having adjacent grid cells 172 stored in the same database object, and the size of the database object being stored. Some grids 170 and access patterns will want very tall and skinny grids 170 that store several values for a very small number (perhaps even 1) grid cells 172. Other grids 170 and access patterns will want a more rounded approach where the height and the footprint of the cylindrical blocks may be roughly the same. For very large grids 170 and access patterns that request data 120 for adjacent or nearby grid cells 172, having short, squat blocks 250 may be the best. Regardless, the height and footprint approach achieves the objective of maximizing the efficiency of read operations 310 on the cylindrical data store.

In a further embodiment, the high-performance gridded database protocol 100 may incorporate a "time to live" (TTL) feature to dynamically expire grids 170. When a stack 340 of grids 170 is ingested into the database 102, a timer is set within the database 102 for that stack 340. Each grid 170, depending on its type, has a TTL value associated with it, for example a number of seconds.

This TTL feature enables support for daily weather information with minimal latency between the time that information is generated and the time that it enters the database 102. The TTL feature also enables application of a limit to the size of the database 102, for example to one to two days' worth of data 120, so that the database 102 can be used to focus on a short range of data 120. In this manner, use of a TTL feature minimizes latency between the time a read operation 310 is requested and the time that the read operation 310 is completed.

TTL also enables support for longer-term utility of the high-performance gridded database protocol 100 in agricultural applications. These applications make use of years of data 120, which is contained in a much larger dataset. For the sake of read efficiency, long-term weather data 120 needs to be comprised of consistently taller stacks 340. The latency between data 120 becoming available and data 120 being written is much less important for these stacks 340, which allows us to wait longer between write operations 110 and form taller stacks 340. The TTL for this longer-term weather data 120 may be set in the multi-month range, which allows for an occasional re-stack to achieve larger stack sizes.

Third, data 120 is frequently re-submitted with minor changes. For some of data 120, the same grid 170 with the same variable and reference time with minor changes to the data 120 may be seen 5 times in an hour. In existing technology, all five versions would have to be written to the database 102, but only the latest version is ever referenced. Also, explicitly deleting data 120 from the database 102 has a large performance penalty, yet keeping four useless copies indefinitely is not necessary. The TTL option resolves this issue in the short-term data 120 by expiring all five copies within 48 hours. For long-term data 120, current information is initially written with a short TTL on the order of days, and later re-stacked once the final version is set into a stack 340 with a multi-month TTL.

In another embodiment, the high-performance gridded database protocol 100 may incorporate constraints to handle issues with data timeliness. While taller stacks 340 optimize for read efficiency, various constraints have to be enforced to maintain timeliness of the data 120 and to avoid overrunning the computational resources of the system that is sending the data 120 to the database. In this embodiment, if a constraint is violated, the stack 340 is considered complete and is written to the database 102, and a new stack 340 is formed starting with the next file.

The high-performance gridded database protocol 100 may include several options to enforce constraints. One such option is a latest limit option, in which grids 170 are submitted at unevenly distributed times. This option imposes a limit on the time in between receiving grids 170. Another option is a mb-limit option to keep from exceeding the total amount of Random Access Memory (RAM), and therefore a limit on the stack size in megabytes may also be imposed. Still another option is a global-mb-limit option. In this option, multiple stacks 340 for different grid specifications may be ingested at once. This limit constrains the total memory available across all stacks 340 that are being processed.

Additional constraints may further be imposed, for example on the maximum number of grids 170 in a stack 340, and on the maximum number of grids 170 in all stacks 340 that are being processed at any time.

In another embodiment, the high-performance gridded database protocol 100 may incorporate a translation layer, so that one logical row in the database 102 can be split into many actual rows. This is performed in a transparent method of translating from the logical row to the actual row, and allows for a dynamic adjustment of the number of cylinders 250 per database row, without higher level application programming interfaces needing to understand the mapping. This effectively provides a database "tuning knob" that solves issues with different versions of a database engine and the total number of cylinders per row in the database 102.

In another embodiment, the high-performance gridded database protocol 100 may incorporate dynamic selection of tile 400 sizes. Stack height can be used to dynamically choose the tile size of the stack 340, so that write performance can be optimized by reducing cylinder overhead. With cylinder overhead, both tall and short stacks 340 are equally penalized, and stacks 340 with more cylinders 250 are penalized more as each cylinder incurs the penalty. The global grids 170 of data 120 used with the present invention may be received infrequently, and usually this results in stacks 340 with height less than ten, as well as many more cylinders 250 than the considerably more frequent stacks 340 for comparatively smaller geographic areas such as the continental United States. As a result, cylinder overhead for short stacks 340 with many cylinders 250 is very high relative to the overhead for tall stacks with much fewer cylinders 250, and the height of the global stacks 340 cannot be adjusted due to timeliness constraints. Dynamic tile size selection addresses this problem, since a larger tile size means more values per cylinder and fewer cylinders 250.

As suggested above, the high-performance gridded database protocol 100 may be configured to make use of long-term collections of weather data 120 for one or more agricultural applications. Such applications may include modeling of various agricultural activity such as crop growth, water usage and irrigation, livestock and rangeland management, soil quality and characteristics, and the like, for which weather information may be used as an input for such modeling. To further facilitate such modeling, the present invention may also be configured to provide data 120 from the high-performance gridded database protocol 100 to one or more application programming interfaces, so that data 120 extracted from the database 102 may be used to model for such agricultural activities.

The read operation 310 of the high-performance gridded database protocol 100 may further include an additional layer that is specifically related to forecasting and determining which grids 170 are most fresh and useful before reading them from the database 102. This concept, known as the priority stack, enables fulfillment of a particular analytic request by drawing data 120 from any number of source datasets. For instance, if the forecast air temperature in Grand Forks for 12 pm today is needed, there are perhaps hundreds of different options to choose from. Some of those options may be forecasts created at different times by the same model, while there may also be many different models to choose from as well. Further, different models may not all cover the same geographic expanse, so it is entirely possible that any of models X, Y, or Z may be used for Grand Forks, but for Tokyo it might be necessary to choose from one of models A, B or Y. The priority stack allows for a preferred ordering of the resources to try to draw data 120 from. The models in this case may be prioritized as:

1st: X
2nd: Y
3rd: A
4th: Z
5th: B

With this priority stack, the request for Grand Forks is filled with data 120 from model X. For Tokyo, there is an attempt to draw data 120 from model X, but that request would be denied, so priority moves to model Y. Since Y has the requested data 120 available at Tokyo's location, the present invention fulfills Tokyo's request with model Y's data 120. The present invention is therefore a way of layering a patchwork of data grids 170 all over the world, such that for any particular point in the world data 120 is drawn from the most-preferred resource that is available for that location.

It should be noted that data 120 that is written to, arranged within, and extracted from the database 102 using the high-performance gridded database protocol 100 of the present invention may be any type of information for which such techniques are useful in accomplishing the objectives set forth herein. For example, data 120 may include many different types of traffic information, such as traffic speed data, traffic volume data, roadway incident data reflective of real-time and/or actual conditions being experienced on a roadway, and crowd-sourced observational data provided by individuals using mobile telephony devices or tablet computers using software tools such as mobile applications. It is therefore contemplated that the high-performance gridded database protocol 100 of the present invention may have utility for different kinds of data 120, and it is not intended to be limited to weather or meteorological information.

Nevertheless, where data 120 is weather-related information, this data may include many different types of weather information, such as for example predicted, forecasted, and real-time weather data 120. This may generally include data 120 related to meteorological characteristics such as atmospheric temperature, humidity, wind speed, various forms of precipitation, and other such information, and may be derived from, for example, from radar data collected from radar sensing systems, and satellite data from satellite-based weather observation and tracking systems. Weather information may also include data 120 from numerical weather prediction models and surface networks such as described further herein. Weather information may also be derived from data generated from crowd-sourced observations using mobile applications configured on devices such as telephones and tablets, and using social media feeds.

Different sources of weather information, as noted above, may include information from both in-situ and remotely-sensed observation platforms. For example, the numerical weather models (NWP) and/or surface networks may be combined with data from weather radars and satellites to reconstruct the current weather conditions on any particular link or segment of roadway represented by a grid 170. There are numerous industry NWP models available, and any such models may be used to input weather variables in the present invention. NWP models used herein at least include RUC (Rapid Update Cycle), WRF (Weather Research and Forecasting Model), GFS (Global Forecast System), and GEM (Global Environmental Model). This weather data is received in real-time, and may come from several different NWP sources, such as from Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global observation resources may also be utilized. Such mesoscale numerical weather prediction models may be specialized in forecasting weather with more local detail than the models operated at government centers, and therefore contain smaller-scale data collections than other NWP models used. These mesoscale models are very useful in characterizing how weather conditions may vary over small distances and over small increments of time. The present invention may accommodate data from all types of NWP models, regardless of whether publicly, privately, or internally provided or developed.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed the by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of storing and arranging gridded data for high-performance extraction of information from a database, comprising:
ingesting meteorological data from one or more sources of weather information, and identifying grids relative to a specific geographical location to populate individual grid cells with the meteorological data in a database;
separating the grids into stacks, each stack comprising grid cells corresponding to the specific geographic location and having a coverage area of a length X and a width Y, and each grid cell comprised of a cylinder of a height Z, so that each stack includes X times Y times Z values;
indexing the populated grid cells so that a plurality of values are grouped together in stacks relative to the specific geographic location, in which a payload of the plurality of values that are stored in the cylinders includes the height representing a number of different values in multiple variables, and a spread covering several of the grid cells represented by a footprint having a width and a length covering more than a single grid cell, to permit a read of the plurality of values to extract meteorological data for the specific geographical location;
storing one stack in a database cell with the cylinder height and coverage area dynamically adjusted to optimize storage, so that fetching a single database cell returns a stack of meteorological data that is spatially and temporally related and represents meteorological characteristics stored on a common grid projection for the specific geographical location;
dynamically expiring grids by setting a timer within the database for a stack of grid cells, wherein the timer is set when the values in the stack of grid cells are ingested into the database; and
enforcing constraints to maintain a timeliness of values stored in the database, wherein the constraints include at least one of a latest limit constraint to impose a limit on a time in between receiving grids, a mb-limit constraint to impose a limit on a stack size, a global-mb-limit constraint to impose a limit on total memory available across all stacks processed, a maximum number of grids in a stack, and a maximum number of grids in all stacks processed at any time, and
wherein a selection of the height and the spread includes a consideration of physical memory, a consideration of cache advantages of having adjacent grid cells stored in the same database object, and a size of the database object being stored, relative to an extraction of the payload of stored data in the specific geographical location.

2. The method of claim 1, further comprising initially selecting one or more grids to intelligently build the stacks comprising the values so that grid cells that are related by geographical location are grouped into the same cylinder.

3. The method of claim 1, further comprising arranging grids into tiles comprised of a single value for a grid, and storing cylinders of tiles.

4. The method of claim 1, further comprising prioritizing a stack so that meteorological data may be drawn from an ordered preference of resources to fulfill specific requests.

5. A method comprising:
populating individual grid cells within a database by collecting and writing meteorological data from one or more sources of weather information in a manner that groups values for a specific geographic location together in related grid cells within a stack by separating the grids into stacks, each stack comprising grid cells corresponding to the specific geographic location and having a coverage area of a length X and a width Y, and each grid cell comprised of a cylinder of a height Z, so that each stack includes X times Y times Z values;
arranging a payload of the values into cylinders so that the cylinders have both the height representing a number of different values in multiple variables, and a spread covering several of the grid cells represented by a footprint having a width and a length covering more than a single grid cell, by storing one stack in a database cell with the cylinder height and coverage area dynamically adjusted to optimize storage, so that fetching a single database cell returns a stack of meteorological data that is spatially and temporally related and represents meteorological characteristics stored on a common grid projection for the specific geographical location;
extracting gridded data by retrieving a whole stack of grid cells so that only a single read operation is needed to obtain values for the specific geographic location; and
dynamically expiring grids by setting a timer within the database for a stack of grid cells, wherein the timer is set when the values in the stack of grid cells are ingested into the database; and
enforcing constraints to maintain a timeliness of values stored in the database, wherein the constraints include at least one of a latest limit constraint to impose a limit on a time in between receiving grids, a mb-limit constraint to impose a limit on a stack size, a global-mb-limit constraint to impose a limit on total memory available across all stacks processed, a maximum number of grids in a stack, and a maximum number of grids in all stacks processed at any time, and
wherein a selection of the height and the spread includes a consideration of physical memory, a consideration of cache advantages of having adjacent grid cells stored in the same database object, and a size of the database object being stored, relative to an extraction of the payload of stored data in the specific geographical location.

6. The method of claim 5, further comprising initially selecting one or more grids to intelligently build stacks comprising the values so that grid cells that are related by geographical location are grouped into the same cylinder.

7. The method of claim 5, further comprising arranging grids into tiles comprised of a single value for a grid, and storing cylinders of tiles.

8. The method of claim 5, further comprising prioritizing a stack so that meteorological data may be drawn from an ordered preference of resources to fulfill specific requests.

9. A high-performance gridded database protocol, comprising:
in a computing environment that includes a plurality of software and hardware components coupled to at least one processor, the at least one processor configured to carry out one or more program instructions to execute a database protocol having a plurality of operations;
a write operation in the plurality of operations, the write operation configured to populate individual grid cells within a database by collecting and writing meteorological data from one or more sources of weather information in a manner that groups values for a specific geographic location together in related grid cells within a stack by separating the grids into stacks, each stack comprising grid cells corresponding to the specific geographic location and having a coverage area of a length X and a width Y, and each grid cell comprised of a cylinder of a height Z, so that each stack includes X times Y times Z values;

a store operation in the plurality of operations, the store operation configured to arrange a payload of the values into cylinders so that the cylinders have both the height representing a number of different values multiple variables, and a spread covering several of the grid cells represented by a footprint having a width and a length covering more than a single grid cell, by storing one stack in a database cell with the cylinder height and coverage area dynamically adjusted to optimize storage, so that fetching a single database cell returns a stack of meteorological data that is spatially and temporally related and meteorological characteristics stored on a common grid projection for the specific geographic location, wherein the store operation dynamically expires grids by setting a timer within the database for a stack of grid cells, wherein the timer is set when the values in the stack of grid cells are ingested into the database, and wherein the store operation enforces constraints to maintain a timeliness of values stored in the database, the constraints including at least one of a latest limit constraint to impose a limit on a time in between receiving grids, a mb-limit constraint to impose a limit on a stack size, a global-mb-limit constraint to impose a limit on total memory available across all stacks processed, a maximum number of grids in a stack, and a maximum number of grids in all stacks processed at any time; and a read operation in the plurality of operations, the read operation configured to extract gridded data by retrieving a whole stack of grid cells so that only a single read operation is needed to obtain values for the specific geographic location, and wherein a selection of the height and the spread includes a consideration of physical memory, a consideration of cache advantages of having adjacent grid cells stored in the same database object, and a size of the database object being stored, relative to an extraction of the payload of stored data in the specific geographical location.

10. The protocol of claim 9, wherein the store operation initially selects one or more grids to intelligently build stacks comprising the values so that grid cells that are related by geographical location are grouped into the same cylinder.

11. The protocol of claim 10, wherein the read operation prioritizes a stack so that meteorological data may be drawn from an ordered preference of resources to fulfill specific requests.

12. The protocol of claim 9, wherein the store operation arranges grids into tiles comprised of a single value for a grid, and stores cylinders of tiles.

* * * * *